United States Patent
Kephart et al.

(10) Patent No.: US 11,230,507 B2
(45) Date of Patent: *Jan. 25, 2022

(54) FORMULATIONS AND PRODUCTS TO REPLACE SINGLE-USE PLASTICS AND POLYSTYRENE WITH BIO-BENIGN MATERIALS SUCH AS AGRICULTURAL WASTES

(71) Applicant: NUTJOBS, Carmel, CA (US)

(72) Inventors: Paul Ray Kephart, Carmel, CA (US); Samuel Ellman, Somerville, MA (US)

(73) Assignee: NUTJOBS, Carmel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,278

(22) Filed: Jun. 28, 2021

(65) Prior Publication Data

US 2021/0347708 A1    Nov. 11, 2021

Related U.S. Application Data

(63) Continuation-in-part of application No. 17/074,034, filed on Oct. 19, 2020, now Pat. No. 11,046,836.

(60) Provisional application No. 62/923,044, filed on Oct. 18, 2019.

(51) Int. Cl.
| | |
|---|---|
| *C05G 5/40* | (2020.01) |
| *C08L 97/00* | (2006.01) |
| *C08L 1/02* | (2006.01) |
| *C05F 11/08* | (2006.01) |
| *C08K 11/00* | (2006.01) |
| *A01G 9/02* | (2018.01) |
| *B29B 13/10* | (2006.01) |
| *B29K 511/00* | (2006.01) |

(52) U.S. Cl.
CPC .............. *C05G 5/40* (2020.02); *C05F 11/08* (2013.01); *C08K 11/005* (2013.01); *C08L 1/02* (2013.01); *C08L 97/005* (2013.01); *A01G 9/021* (2013.01); *B29B 13/10* (2013.01); *B29K 2511/00* (2013.01); *C08L 2201/06* (2013.01); *C08L 2203/30* (2013.01); *C08L 2205/03* (2013.01); *C08L 2207/20* (2013.01); *C08L 2207/322* (2013.01)

(58) Field of Classification Search
CPC ...... C08K 11/005; C08G 83/08; C08G 63/08; C08L 67/04; C08L 2201/06; C08L 97/00; C08J 2367/04; B29K 2067/046; B29K 2995/006
USPC .......................................................... 523/128
See application file for complete search history.

(56) References Cited

U.S. PATENT DOCUMENTS

2002/0064495 A1 * 5/2002 Miura ..................... C10B 53/02
423/445 R

FOREIGN PATENT DOCUMENTS

| CN | 108641256 | * 10/2018 |
| WO | WO 2019/113520 | * 6/2019 |

OTHER PUBLICATIONS

Derwent of CN 108641256 (Year: 2018).*

* cited by examiner

*Primary Examiner* — Doris L Lee
(74) *Attorney, Agent, or Firm* — Polsinelli PC

(57) ABSTRACT

The present invention provides methods for preparing the nut waste pot composites from a nut waste component, one or more binders, and an oil.

16 Claims, 6 Drawing Sheets

FORMULATIONS AND PRODUCTS TO REPLACE SINGLE-USE PLASTICS AND POLYSTYRENE WITH BIO-BENIGN MATERIALS SUCH AS AGRICULTURAL WASTES

CROSS REFERENCE TO RELATED APPLICATIONS

The present application is a continuation in part of, and claims priority 35 U.S.C. § 120 to U.S. patent application Ser. No. 17/074,034, filed on Oct. 19, 2020, entitled, "FORMULATIONS AND PRODUCTS TO REPLACE SINGLE-USE PLASTICS AND POLYSTYRENE WITH BIO-BENIGN MATERIALS SUCH AS AGRICULTURAL WASTES," which is hereby incorporated by reference.

FIELD OF THE INVENTION

The present disclosure generally relates to cured nut waste composites comprising a nut waste component and one or more binders which are extruded, molded, or thermoformed into a pot form.

BACKGROUND OF THE INVENTION

Plastic products have been shown to not only pollute the environment through their production but also do not appreciably degrade. Products such as Styrofoam, plastic grocery bags, plastic bottles, and plastic six pack ring carriers for soda and beer cans have been documented which adversely affects wildlife, wildlife habitat, and human life. Plastic pollution can afflict land, waterways, and oceans. It is estimated that 1.1 to 8.8 million tons of plastic waste enters the ocean from coastal communities each year. Living organisms, particularly marine animals, can be harmed either by mechanical effects, such as entanglement in plastic objects, problems related to ingestion of plastic waste, or through exposure to chemicals within plastics that interfere with their physiology. Effects on humans include disruption of various hormonal mechanisms. As of 2018, about 380 million tons of plastics are produced worldwide each year. From the 1950s up to 2018, an estimated 6.3 billion tons of plastic have been produced worldwide, of which an estimated 9% has been recycled and another 12% has been incinerated. Even though plastics can be recycled, their rate of biodegradability is considered low.

Nut wastes, shells, hulls, and nut enclosures, from nuts are generally incinerated or discarded. This waste not only places a burden on the environment but also wastes a large amount of useable resources. This waste is considered a biomass and can be used in products which environmentally friendly and reduce the pollution in the environment.

As an example, California produces an estimated 80% of the world's almond nuts. During the 2013-2014 crop year, nut growers produced approximately 7 billion pounds of almond nut almond fruit (drupe) resulting in 2 billion pounds of almond nuts, 4 billion pounds of almond hulls, and 1 billion pounds of almond shells. Most of these almond nut shells and almond hulls were sold as cattle feed and used in fuel for boilers and power generation. However, a sizable fraction of these almond shells and almond hulls were sent to landfills. Thus, an important resource in the almond nut almond shells and hulls were wasted.

Other culinary nuts and non-culinary nuts face the same fate as the almonds. The drupes or fruit are removed, leaving the hull, shell, nut enclosure, or a combination of these as a waste.

Customers of these plastic products have requested new, ecofriendly products. These products would not leave a lasting footprint on the environment. Some of these products, such as cups, are now made solely of paper.

What is needed is an environmentally friendly product which can be used to replace plastic products and have increased biodegradability.

FIGURES

FIG. 1, FIG. 2, FIG. 3, and FIG. 4 are graphical representations of various pots produced using the nut waste composite.

SUMMARY OF THE INVENTION

Figure 1:
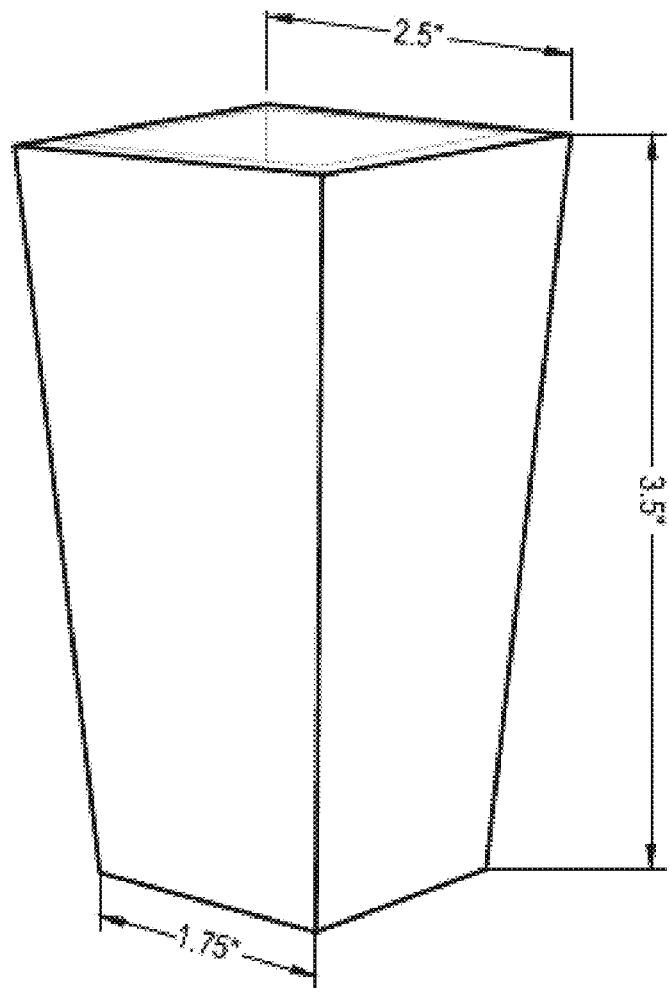
Figure 2:
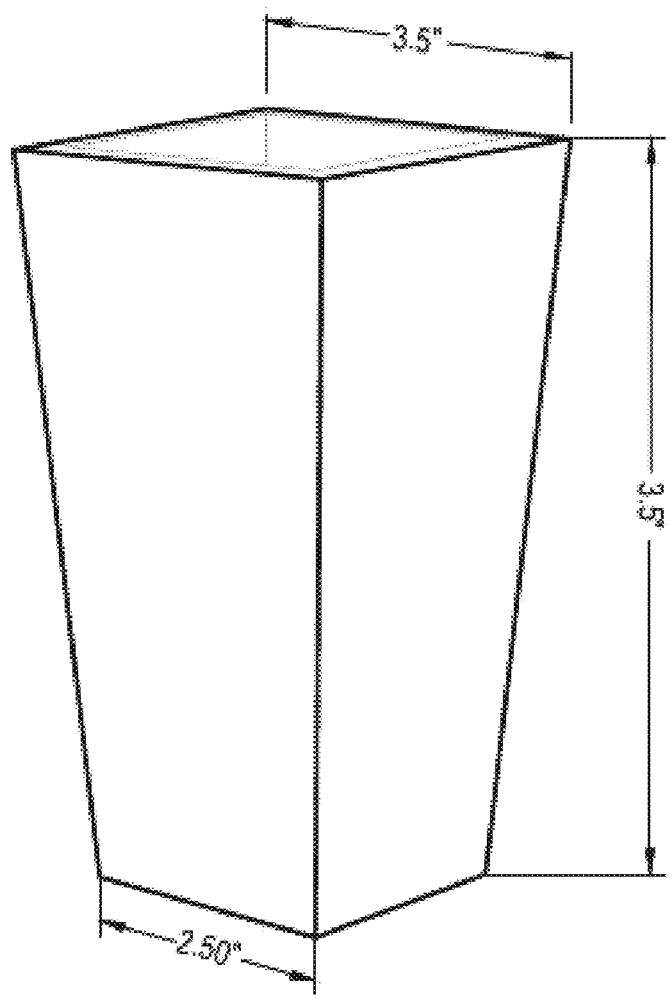
Figure 3:
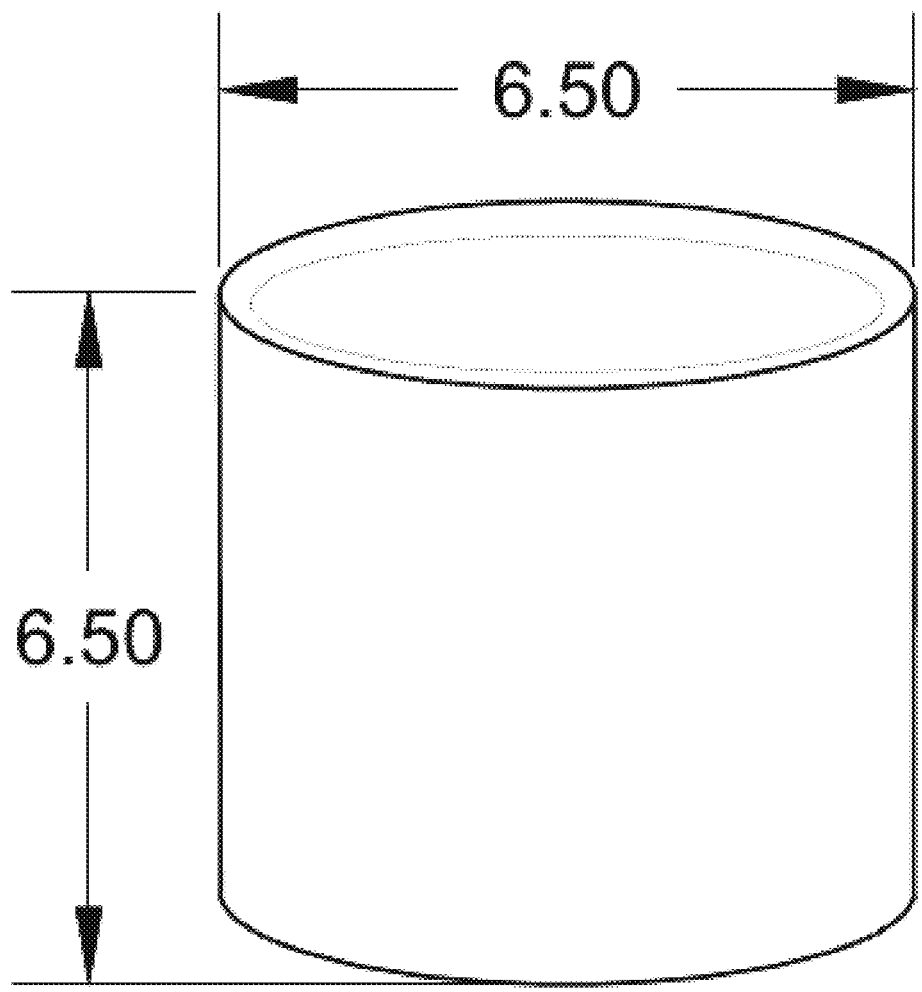
Figure 4:
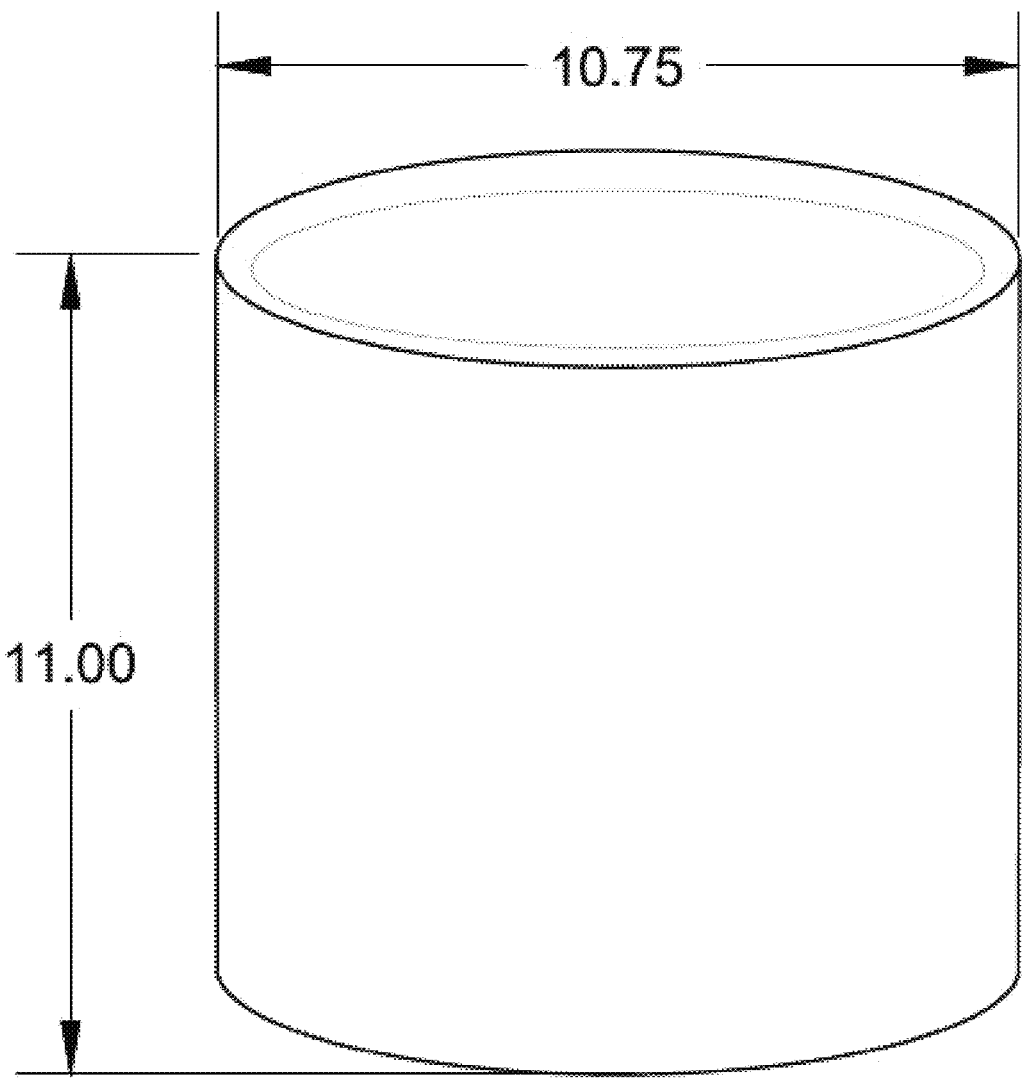

One aspect, as disclosed herein, are cured nut waste pot composite prepared by the following method comprising the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying, sterilizing, or torrefying the nut waste component; (c) cooling the dried or pH adjusted then dried, sterilized, or torrefied nut waste component to room temperature; (d) grinding the nut waste component to a size less than 250 µm; (e) contacting 65 to 99.9 wt % of the nut waste component from step (c); 0.1 to 35 wt % of one or more binders selected from a group consisting of polyhydroxybutyrate (PHB), polyhydroxyalkanoate (PHA), polyhydroxybutyrate (PHB), polylactic acid (PLA), guayule, natural latex, bentonite, an anionic starch, hyaluronic acid, and any combinations thereof; and 0.0 to about 20.0 wt % of an oil; (e) heating the mixture to a temperature from about 150° C. to about 320° C. for about 15 minutes; (g) extruding, molding, or thermoforming the heated mixture from step (f) into a pot form; and (h) cooling the pot form to form the cured nut waste pot composite.

Another aspect, as disclosed herein, are cured nut waste pot composite prepared by the following method comprising the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying, sterilizing, or torrefying the nut waste component; (c) cooling the dried or pH adjusted then dried, sterilized, or torrefied nut waste component to room temperature; (d) grinding the nut waste component to a size less than 250 µm; (e) contacting 15 to 65 wt % of the nut waste component from step (c); 15 to 85 wt % of one or more binders selected from a group consisting of polyhydroxybutyrate (PHB), polyhydroxyalkanoate (PHA), polyhydroxybutyrate (PHB), polylactic acid (PLA), guayule, natural latex, bentonite, an anionic starch, hyaluronic acid, and any combinations thereof; and 0.0 to about 20.0 wt % of an oil; (f) heating the mixture to a temperature from about 150° C. to about 320° C. for about 15 minutes; (g) extruding, molding, or thermoforming the heated mixture into a pot form; and (h) cooling the pot form to form the cured nut waste pot composite.

In yet another aspect, as disclosed herein, are cured nut waste pot composite prepared by the following method comprising the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying, sterilizing, or torrefying the nut waste component; (c) cooling the dried or pH adjusted then dried, sterilized, or torrefied nut waste component to room temperature; (d) grinding the nut waste component to a size less than 250 µm; (e) contacting 5 to 15 wt % of the nut waste component from step (c); 65 to 95 wt % of one or more binders selected from a group consisting of polyhydroxybutyrate (PHB), polyhydroxyalkanoate (PHA), polyhydroxybutyrate (PHB), polylactic acid (PLA), guayule, natural latex, bentonite, an anionic starch, hyaluronic acid, and any combinations thereof; and 0.0 to about 20.0 wt % of an oil; (f) heating the mixture to a temperature from about 150° C. to about 320° C. for about 15 minutes; (g) extruding, molding, or thermoforming the heated mixture from step (f) into a pot form; and (h) cooling the pot form to form the cured nut waste pot composite.

Other features and iterations of the invention are described in more detail below.

DETAILED DESCRIPTION OF THE INVENTION

Provided herein are composites of cured nut waste, methods for preparing these cured nut waste composites, and methods for utilizing these nut waste composites. Advantageously, these cured nut waste composites are low cost, environmentally friendly, biodegradable, easily manufactured, and can be formed into various shapes and sizes.

(I) Cured Nut Waste Composites

The present disclosure encompasses cured nut waste composites comprising a nut waste component, one or more binders, and an oil. The cured nut waste pot composite optionally comprises at least one fungus, at least one bacterium, or a combination of at least one fungus and at least one bacterium. After forming the cured nut waste composites, the cured nut waste composites are extruded, molded, or thermoformed into a pot form. These pots are durable, permeable, biodegradable, and biocompostable.

(a) Nut Waste Component in Composite

The nut waste component is a by-product of removing the nut hull and nut shell from the fruit of the nut, also known as the drupe. Generally, the nut hull and nut shell are disposed of and not utilized in any significant amount in a commercial product. Generally, the nut waste component includes a nut shell, a nut hull, or a combination of a nut shell and a nut hull. In various embodiments, the nut waste component including nut shells, a nut hulls, or a combination of nut shells and nut hulls may be pre-processed before introduction into the nut waste composite.

A variety of nut shells and nut hulls may be used in the nut waste component. Generally, these nut shells and nut hulls can be derived from a variety of nuts. Non-limiting examples of the these nuts may be an acorn, American beech, almond, breadfruit, candlenut, chestnuts, peanuts, hazelnuts, kola nuts, palm nuts, red bopple nuts, cashews, coconuts, hickory, pecans, Jack nuts, pistachio, walnuts, pine nuts, ginko nuts, Brazil nuts, macadamia, and paradise nut. In one embodiment, the nut is an almond.

As appreciated by the skilled artisan, the nut waste component comprises various mixtures of cellulose, hemicellulose, and lignin. The mixtures of cellulose, hemicellulose, and lignin provide hydroxyl and phenolic functionalities on the cellulose, hemicellulose, and lignin that cross-link with themselves and/or one or more binders. This cross-linking produces a nut waste pot composite that provides increased strength, flexibility, and durability.

In various embodiments, the nut waste component including nut shells, a nut hulls, or a combination of nut shells and nut hulls may be a pre-processing step before introduction into the pot composite. This pre-processing step dries the nut waste component, adjusts the pH of the nut waste component and dries the nut waste component, adjusts the pH of the nut waste component and sterilizes the nut waste component, or adjusts the pH of the nut waste component and torrefies the nut waste component.

In general, the nut waste component has a residual moisture content of less than 0.5 wt % water. In various embodiments, the nut waste component has a residual moisture content of less than 0.5 wt % water, less than 0.4% water, less than 0.3% water, less than 0.2% water, or less than 0.1% water. In one embodiment, the nut waste component has a residual water content of less than 0.1 wt %.

The temperature at which the nut waste component was dried may range from about 80° C. to about 120° C. for a duration of time. This drying process may utilize an inert atmosphere, reduced pressure (vacuum), or a combination of an inert gas and reduced pressure.

In general, the nut waste component has an adjusted pH ranging from 5.5 to 8.0 before introduction into the composite. In various embodiments, the pH of the nut waste hulls, the nut waste shells, or a combination of the nut waste hulls and nut waste shells ranges from 5.5 to 8.0, or 6.5 to 7.0.

The nut waste component has a specific size before introduction into the composite. In one embodiment, the size of the nut waste component may be less than 250 µm. In another embodiment, the size of the nut waste component may be less than 500 µm and greater than 250 µm. These sizes of the nut waste component provide composites that can be readily formed into various shapes, allows for increased strength of the composites, and allows the composites to be flexible.

In general, the weight percentage (wt %) of the nut waste component may range from about 5 wt % to about 99.9 wt %. In various embodiments, the wt % of the nut waste component may range from about 5 wt % to about 99.9 wt %, from about 15 wt % to about 65 wt %, or from 30 wt % to about 50 wt %. In one embodiment, the weight percentage (wt %) of the nut waste component ranges from about 65 wt % to about 99.9 wt %. In another embodiment, the weight percentage (wt %) of the nut waste component ranges from about 15 wt % to about 65 wt %. In yet another embodiment, the weight percentage (wt %) of the nut waste component ranges from about 5 wt % to about 15 wt %.

(b) Binders in the Nut Waste Composite

The nut waste composite comprises one or more binders. These binders cross-link with the hydroxyl and/or phenolic functionality of the cellulose, hemicellulose, and lignin. Non-limiting examples of suitable one or more binders are selected from a group consisting of polyhydroxybutyrate (PHB), polyhydroxyalkanoate (PHA), polylactic acid (PLA), guayule, natural latex, bentonite, an anionic starch, hyaluronic acid, water, and any combinations thereof. In one embodiment, the one or more binders is polyhydroxybutyrate (PHB. In another embodiment, the binder is water. The water may be distilled water, deionized water, or potable (tap) water.

Generally, the weight % (wt %) of one or more binders in the nut waste composite may range from 0.1 wt % to about 95 wt %. In various embodiments, the wt % of the one or more binders may range from about 0.1 wt % to about 95 wt %, from about 0.1 wt % to about 15.0 wt %, from about 15 wt % to about 65 wt %, from about 30 wt % to about 50 wt %, or from about 65 wt % to about 75 wt %. In one embodiment, the wt % of one or more binders ranges from about 0.1 wt % to about 35 wt %. In another embodiment, the wt % of one or more binders ranges from about 35 wt % to about 85 wt %. In yet another embodiment, the wt % of one or more binders ranges from about 85 wt % to about 95 wt %. In yet another embodiment, the wt % of one or more binders ranges from 0.1 wt % to about 15 wt %. In still another embodiment, the wt % of one or more binders ranges from about 15 wt % to about 65 wt %. In yet another embodiment, the wt % of one or more binders from about 65 wt % to about 75 wt %.

(c) An Oil

The nut waste pot composite may further comprises an oil. The oil, as detailed herein, improves the composite's ductility and facilitates releasing the composite from a mold. The oil also provides for acceptable pressure ranges during extruding, molding, or thermoforming allowing for the composite to be formed in various shapes and sizes.

A variety of oils may be used in the nut waste pot composite. Non-limiting examples of suitable oils comprise castor oil, coconut oil, corn oil, cottonseed oil, palm oil, rapeseed oil, safflower oil, soybean oil, linseed oil, or tung oil. In an embodiment, the oil useful in the nut water pot composite comprises castor oil.

In general, the oil in the nut waste pot composite may range from 0 wt % to about 20 wt %. In various embodiments, the oil in the nut waste composite may range from 0 wt % to about 5 wt %, from about 5 wt % to about 10 wt %, from about 7.5 wt % to about 12.5 wt %, from about 10 wt % to about 15 wt %, or from about 15 wt % to about 20 wt %. In an embodiment, the oil in the nut waste pot composite ranges from about 7.5 wt % to about 12.5 wt %. In another embodiment, the oil in the nut waste composite is about 10 wt %.

(d) Optionally Comprising at Least One Fungus, at Least One Bacterium, or at Least One Fungus and at Least One Bacterium The nut waste composite naturally comprises at least one fungus, at least one bacterium, or a combination of at least one fungus and at least one bacterium. The nut waste composite may optionally have an additional at least one fungus, at least one bacterium, or a combination of at least one fungus and at least one bacterium introduced into it. The inclusion of at least one fungus, at least one bacterium, or a combination of at least one fungus and at least one bacterium enhances the biodegradability and biocompostability of the composite and the product that is prepared from the composite. Non-limiting examples of suitable fungus and bacterium may be *Mycorrihizal inoculum, aureofaciens, Deinococcus erythromyxa, Glomus intraradices, Glomus mosseae, Glomus aggregatum, Glomus clarum, Glomus deserticola, Glomus etunicatum, Gigaspora margarita, Rhizopogon villosullus, Rhizopogon luteolus, Rhizopogon amylopogon, Rhizopogon fulvigleba, Pisolithud tinctorius, Laccaria lacata, Laccari bicolor, Suillus granulatus, Suillus puntatapies, Trichoderma harzianum Trichoderma konigii, Bacillus subtillus, Bacillus lichenformis, Bacillus azotoformans, Bacillus megaterium, Bacillus coagulans, Bacillus pumlis, Bacillus thurengiensis, Bacillus stearothermiphilis, Paenibacillus polymyxa, Paenibacillus durum, Paenibacillus florescence, Paenibacillus gordonae, Azotobacter polymyxa, Azotobacter chroococcum, Sacchtomyces cervisiae, Streptomyces griseues, Streptomyces lydicus, Pseudomonas aureofaceans, Deinococcus erythromyxa, Aureofaceans,* and *Deinococcus erythromyxa.*

The inclusion of the additional at least one fungus, at least one bacterium, or a combination of at least one fungus and at least one bacterium may occur after the composite is prepared; after the composite is extruded, molded, or thermoformed; or after the composite is cooled into the final form.

(e) Properties of the Nut Waste Composite

The cured nut waste composites exhibit some beneficial and unique properties. Some of these properties are increased strength, enhanced biodegradability, biocompostable, ease of production of the nut waste composite, and low cost. These properties are unique.

In general, the cured nut waste pot composites exhibit an elastic modulus from about 0.9 GPa (gigs pascals, 900 N/mm$^2$) to about 2.8 GPa (2800 N/mm$^2$). In various embodiments, the cured nut waste pot composites exhibit and elastic modulus from about 0.9 GPa to about 2.8 GPa, from about 0.9 GPa to about 1.2 GPa, from about 1.2 GPa to about 1.5 GPa, from about 1.5 GPa to about 1.8 GPa, from about 1.8 GPa to about 2.0 GPa, or from about 2.0 GPa to about 2.8 GPa. In one embodiment, the cured nut waste pot composites exhibit an elastic modulus from about 0.9 GPa to about 1.2 GPa. In another embodiment, the cured nut waste composites exhibit an elastic modulus ranging from about 20 GPa to about 28 GPa. These elastic modulus values indicate that the cured nut waste composites are rigid.

In general, the cured nut waste pot composites exhibit a break stress (mega pascals, MPa, N/mm$^2$) from about 3.0 MPa to about 40 MPa. In various embodiments, the cured nut waste pot composites exhibit a break stress from about 3.0 MPa to about 40 MPa, from about 3.0 MPa to about 10 MPa, from about 10 mPa to about 20 MPa, from about 20 MPa to about 30 MPa, or from about 30 MPa to about 40 MPa. In one embodiment, the cured nut waste pot composites exhibit a break stress from about 10 mPa to about 20 MPa.

Generally, the cured nut waste pot composites exhibit a Flexural Strength from about 0.5 mPa to about 20.0 MPa. In various embodiments, the cured nut waste pot composites exhibit a Flexural Strength from about 0.5 mPa to about 5.0 MPa, from about 5.0 MPa to about 10.0 MPa, from about 10.0 MPa to about 15.0 MPa, or from about 15.0 MPa to about 20.0 MPa. In one embodiment, the cured nut waste pot composites exhibit a Flexural Strength from about 0.5 mPa to about 7.0 MPa. In another embodiment, the cured nut waste pot composites exhibit a Flexural Strength from about 10.0 mPa to about 20.0 MPa.

In general, the cured nut waste pot composites exhibit a Maximum Strain Percentage (%) from about 0.5% to about 7%. In various embodiments, the cured nut waste pot composites exhibit a Maximum Strain Percentage from about 0.5% to about 5%, from about 1% to about 2%, from about 2% to about 3%, from about 3% to about 4%, from about 4% to about 5%, from about 5% to about 6%, or from about 6% to about 7%. In one embodiment, the cured nut waste pot composites exhibit a maximum Strain Percentage from about 1.0% to about 5%.

Generally, the cured nut waste pot composites exhibit a Toughness (J/m$^3$) from about 0.006 to about 0.7. In various embodiments, the cured nut waste pot composites exhibit a Toughness (J/m$^3$) from about 0.006 to about 0.7, from about 0.006 to about 0.01, from about 0.01 to about 0.05, from about 0.05 to about 0.1, from about 0.1 to about 0.2, from about 0.2 to about 0.3, from about 0.3 to about 0.4, from about 0.4 to about 0.5, from about 0.5 to about 0.6, from about 0.6 to about 0.7. In one embodiment, the cured nut waste pot composites exhibit a Toughness ($J/m^3$) from about 0.006 to about 0.7. In another embodiment, the cured nut waste pot composites exhibit a Toughness ($J/m^3$) from about 0.2 to about 0.7.

With the incorporation of the nut waste component, the cured nut waste pot composites are rigid. The nut waste composites are softer and more flexible as compared to plastic materials. During the preparation of the nut waste pot composites, the nut waste component increases the plasticity of the composites, decreases the viscosity and friction as measured by a reduced amount of torque necessity for compounding.

The nut waste composites produced may be formed or casted into a number of cured forms. These formed or casted forms may be further melted and reformed or recast into alternate final forms. Some non-limiting examples of suitable forms or shapes are not limited to viscous liquid resins, solid resins, pellets, flakes, disks, wafers, or ribbons. Some final forms may be a pot, a tray, or a panel.

(e) Exemplary Embodiments

In one embodiment, the cured nut waste pot composite is prepared by the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying, sterilizing, or torrefying the nut waste component; (c) cooling the dried or pH adjusted then dried, sterilized, or torrefied nut waste component to room temperature; (d) grinding the nut waste component to a size less than 250 μm; (e) contacting 65 to 99.9 wt % of the nut waste component from step (d); 0.1 to 35 wt % of at least one or more binders selected from a group consisting of polyhydroxybutyrate (PHB), polyhydroxyalkanoate (PHA), polyhydroxybutyrate (PHB), polylactic acid (PLA), guayule, natural latex, bentonite, an anionic starch, hyaluronic acid, and any combinations thereof; and 0.0 to about 20 wt % of an oil; (e) heating the mixture to a temperature from about 150° C. to about 320° C. for about 15 minutes; (g) extruding, molding, or thermoforming the heated mixture from step (f) into a pot form; and (h) cooling the pot form to form the cured nut waste pot composite.

In another embodiment, the cured nut waste pot composite is prepared by the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying, sterilizing, or torrefying the nut waste component; (c) cooling the dried or pH adjusted then dried, sterilized, or torrefied nut waste component to room temperature; (d) grinding the nut waste component to a size less than 250 μm; (e) contacting 15 to 65 wt % of the nut waste component from step (d); 35 to 85 wt % of at least one or more binders selected from a group consisting of polyhydroxybutyrate (PHB), polyhydroxyalkanoate (PHA), polyhydroxybutyrate (PHB), polylactic acid (PLA), guayule, natural latex, bentonite, an anionic starch, hyaluronic acid, and any combinations thereof; and 0.0 wt % to 20 wt % of an oil; (f) heating the mixture to a temperature from about 150° C. to about 320° C. for about 15 minutes; (g) extruding, molding, or thermoforming the heated mixture into a pot form; and (h) cooling the pot form to form the cured nut waste pot composite.

In yet another embodiment, the cured nut waste pot composite is prepared by the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying, sterilizing, or torrefying the nut waste component; (c) cooling the dried or pH adjusted then dried, sterilized, or torrefied nut waste component to room temperature; (d) grinding the nut waste component to a size less than 250 μm; (e) contacting 5 to 15 wt % of the nut waste component from step (d); 85 to 95 wt % of at least one or more binders selected from a group consisting of polyhydroxybutyrate (PHB), polyhydroxyalkanoate (PHA), polyhydroxybutyrate (PHB), polylactic acid (PLA), guayule, natural latex, bentonite, an anionic starch, hyaluronic acid, and any combinations thereof; and 0.0 wt % to about 20 wt % of an oil; (f) heating the mixture to a temperature from about 150° C. to about 320° C. for about 15 minutes; (g) extruding, molding, or thermoforming the heated mixture from step (f) into a pot form; and (h) cooling the pot form to form the cured nut waste pot composite.

(II) Methods for Preparing the Nut Waste Composite

The present disclosure also encompasses methods for preparing the cured nut waste composites. The methods comprising: (a) providing an nut waste component selected from a group consisting of nut shells, nut hulls, and a combination of nut shells and nut hulls; (b) drying the nut waste component or adjusting the pH of the nut waste component then drying, sterilizing, or torrefying the nut waste component; (c) cooling the dried or pH adjusted then dried, sterilized, or torrefied nut waste component to room temperature; (d) adjusting the size of the nut waste component; (e) contacting the nut waste component from step (d), one or more binders, and an oil; (f) heating the components from step (e); (g) extruding, molding, or thermoforming the heated mixture into a pot form; and (h) cooling the pot form to room temperature.

(a) Providing a Nut Waste Component

The method commences by providing a nut waste component. In one embodiment, the nut waste component is obtained from a nut processing facility. In some instances, twigs from the nut tree are removed. Thus, the nut waste component includes nut waste shells, nut waste hulls, or a combination of water nut hulls and nut shells.

(b) Drying the Nut Waste Component or Adjusting the pH of the Nut Waste Component then Drying, Sterilizing, or Torrefying the Nut Waste Component The next step in the method consists of drying the nut waste component or adjusting the pH of the nut waste component then drying, sterilizing, or torrefying the nut waste component.

The nut waste component is dried to reduce the amount of residual water to less than 0.5 wt %. In various embodiments, the nut waste component has a residual moisture content of less than 0.5 wt % water, less than 0.4% water, less than 0.3% water, less than 0.2% water, or less than 0.1% water. In one embodiment, the nut waste component has a residual water content of less than 0.1 wt %.

The temperature for drying the nut waste component may range from about 80° C. to about 120° C. In various embodiments, the temperature of drying may range from about 80° C. to 120° C., from 90° C. to about 110° C., or about 100° C. An inert atmosphere, reduced pressure (vacuum), or a combination of inert atmosphere and reduced pressure may be also utilized in drying the nut waste composite.

The duration of drying depends on the residual water content, the type of nut waste component, the amount of nut waste component that needs to be dried, and the target residual water in the nut waste component. Generally, the duration of drying may range from about 1 hour to about 48 hours. In various embodiments, the duration of drying may range from about 1 hour to about 48 hours, from about 4 hours to 24 hours, or from about 12 hours to about 16 hours. In one embodiment, the duration of drying may range from about 2 hours to about 6 hours.

For adjusting the pH, the nut waste component including nut waste hulls, nut waste shells, or a combination of nut waste hulls and nut shells is contacted with an aqueous solution of a proton acceptor or water and a solid proton acceptor. A pH of a mixture of the nut waste component and water is adjusted to a range of about 5.5 to about 8.0, or about 6.5 to about 7.0.

The nut waste component is initially contacted with water forming a slurry. Once the slurry is prepared, a proton acceptor is contacted to the nut waste slurry. The proton acceptor may be a solid, a concentrated aqueous solution, or a dilute aqueous solution. After the addition is complete, the pH of the nut waste component is adjusted using additional proton acceptor. Alternatively, the nut waste component is contacted with an aqueous solution of the proton acceptor. After the addition is complete, the pH of the nut waste component is adjusted using additional proton acceptor. The concentration of the aqueous proton acceptor may range from about 0.1M to about 20M.

The amount of water used in the preparation of the slurry depends the nut waste component used, the amount of the nut waste component, the ability to adequately stir the slurry, and the specific proton acceptor used to adjust the pH. The water may be deionized, distilled, or potable water.

In general, the amount of water (volume) to the nut waste component (weight) used in the slurry to adjust the pH may range from about 1:1 to about 100:1. In various embodiments, the amount of water (volume) to the amount of nut waste component (weight) used in the slurry may range from about 1:1 to about 100:1, from about 5:1 to about 80:1, from about 10:1 to about 60:1, or from about 20:1 to about 50:1. Once the slurry is prepared, the proton acceptor is added to adjust the pH.

Numerous proton acceptors may be used in adjusting the pH of the slurry of the nut waste component and water. Generally, the proton acceptor may be inorganic in nature. Non-limiting examples of suitable inorganic proton acceptors include sodium hydroxide, potassium hydroxide, calcium hydroxide, barium hydroxide, ammonia, cesium carbonate, sodium bicarbonate, potassium bicarbonate, sodium carbonate, potassium carbonate, calcium carbonate, sodium borate, sodium dihydrogen phosphate, disodium hydrogen phosphate, sodium methoxide, sodium tert-butoxide, potassium tert-butoxide, sodium acetate, and potassium acetate. The amount of the proton acceptor used depends on the initial pH of the nut waste component.

The pH of the slurry of the nut waste component and water is adjusted to a range of 5.5 to 8.0. In various embodiments, the pH of the nut waste hulls, the nut waste shells, or a combination of the nut waste hulls and nut waste shells is adjusted to a range of 5.5 to 8.0, or 6.5 to 7.0 utilizing the proton acceptor. The pH of the slurry is measured through means as disclosed in the arts, such as a pH meter, litmus paper, or an inline pH device.

After completion of the pH adjustment, the pH adjusted nut waste and water is filtered through means known in the art to remove excess water for example but not limited to gravity filtration or centrifugation and may be washed with additional water one or more times. The water used in this washing may be distilled water, deionized water, or potable water.

The pH adjusted material may be then dried, sterilized, or torrefied. This step removes excess water, removes excess water, and eliminates unwanted fungus and bacterium; or removes excess water and eliminates unwanted fungus and bacterium, and removing volatile organic compounds from the nut waste component.

For drying, the pH adjusted nut waste component is contacted with heat. The drying may further comprise utilizing an inert atmosphere such as helium or nitrogen and may utilize reduced pressure (vacuum).

The temperature for drying the nut waste component may range from about 80° C. to about 120° C. In various embodiments, the temperature of drying may range from about 80° C. to about 120° C., from about 90° C. to about 110° C., or about 100° C. An inert atmosphere, reduced pressure (vacuum) or reduced vacuum and inert atmosphere may be also utilized.

The duration of drying depends on the residual water content, the amount of nut waste component that needs to be dried, and the target residual water in the nut waste component. Generally, the target water content in the dried nut waste component is less than 0.5 wt %. In various embodiments, the nut waste component has a residual moisture content of less than 0.5 wt % water, less than 0.4% water, less than 0.3% water, less than 0.2% water, or less than 0.1% water. In one embodiment, the nut waste component has a residual water content of less than 0.1 wt %.

Generally, the duration of drying may range from about 1 hour to about 48 hours. In various embodiments, the duration of drying may range from about 1 hour to about 48 hours, from about 4 hours to 24 hours, or from about 12 hours to about 16 hours.

Sterilization removes excess water but also removes, kills, or deactivates all forms of life (in particular referring to microorganisms such as fungi, bacterium, viruses, spores, unicellular eukaryotic organisms such as *Plasmodium*, etc.) and other biological agents like prions present in the nut waste hull and nut shell. Sterilization may utilize an autoclave, dry heat sterilization, and further utilize a chemical agent such as ethylene oxide, nitrogen dioxide, ozone, and hydrogen peroxide.

The sterilization temperature for drying the nut waste component may range from about 100° C. to about 150° C. In various embodiments, the sterilization temperature for drying may range from about 100° C. to about 150° C., from about 110° C. to about 140° C., or about 125° C.

The duration of drying depends on the residual water content, the amount of nut waste component that needs to be dried, and the target residual water in the nut waste component. Generally, the duration of drying may range from about 1 hour to about 48 hours. In various embodiments, the duration of drying may range from about 1 hour to about 48 hours, from about 4 hours to 24 hours, or from about 12 hours to about 16 hours.

Torrefaction is a mild form of pyrolysis at temperatures typically between 200° C. and 320° C. that removes excess water, removes, kills, or deactivates all forms of life, and removes volatile organic compounds. Torrefaction changes the properties to reduce the amount of tars, organic materials, water, and methane within the nut waste component. Torrefaction produces a relatively dry product and generally hydrophobic material, which reduces or eliminates its potential for organic decomposition.

The torrefaction temperature for drying the nut waste component using may range from about 200° C. to about 320° C. In various embodiments, the torrefaction temperature for drying may range from about 200° C. to about 320° C., from about 220° C. to about 300° C., or about 250° C.

The duration of drying depends on the residual water content, the amount of nut waste component that needs to be dried, and the target residual water in the nut waste component. Generally, the duration of drying may range from about 1 hour to about 48 hours. In various embodiments, the duration of drying may range from about 1 hour to about 48 hours, from about 4 hours to 24 hours, or from about 12 hours to about 16 hours.

(c) Cooling the Dried or pH Adjusted then Dried, Sterilized, or Torrefied Nut Waste Composite to Room Temperature The next step in the method, step (c), comprises cooling the dried or pH adjusted then dried, sterilized, or torrefied nut waste composite to room temperature. The cooled nut waste component allows for a well dispersed heterogeneous mixture with one or more binders.

(d) Grinding the Size of the pH Adjusted Nut Waste Component

The next step in the method, step (d), comprises adjusting the size of the pH adjusted nut waste component from step (c). This method step consists of grinding, milling, and/or crushing the dried nut waster component from step (c) to achieve a specific size of the nut waste component. A solid mesh sieve is additionally used to ensure the nut waste component is in the appropriate size range. The size of the nut waste component after grinding, milling, or crushing may be less than 250 µm or less than 500 µm and greater than 250 µm. In one embodiment, size of the nut waste component after grinding, milling, or crushing may be less than 250 µm. This size of the nut waste component is useful in producing a nut waste pot composite.

(e) Contacting the Nut Waste Component from Step (d), One or More Binders, and an Oil The next step, step (e), in the method consists of contacting nut waste component from step (d), one or more binders, and an oil. The addition of these components in the nut waste pot composite may occur in any sequential order, in portions, or all at the same time. During this contacting step, the mixture of the nut waste component and at least one or more binders is stirred or mixed using methods known in the art, such as, but not limited to mechanical mixing, a mechanical stirring, or magnetic stirring, to ensure the mixture is adequately dispersed.

(f) Heating the Mixture from Step (d)

The next step in the method comprises heating the components from step (f). This step in the method prepares a malleable pre-composite where the hydroxyl functionality of the cellulose, hemicellulose, and lignin react with one or more binders to form an extended polymer network. By maintaining the malleable pre-composite at an elevated temperature and the inclusion of the oil, the malleable pre-composite may be extruded, injection molded, compression molded, air injected, molded, pressed, thermoformed, or other means known in the art to form numerous shapes or numerous forms. As described above, step (e) and step (f) may occur in a single continuous process.

The temperature of heating the components from step (e) may range from about 150° C. to about 320° C. In various embodiments, the temperature of drying may range from about 150° C. to 320° C., from 180° C. to about 285° C., or about 200° C. to about 240° C.

In general, the duration of heating the mixture from step (e) may range from about 5 minutes to about 6 hours. In various embodiments, the duration of heating the mixture from step (e) may range from about 5 minutes to about 6 hours, from about 1 hour to 5 hours, or from about 2 hours to about 4 hours. In one embodiment, the duration of heating the mixture from step (e) is about 15 minutes.

With the incorporation of the nut waste component into the composite, the nut waste composite acts a plasticizer. The oil provides reduced flow pressures for the formation of the desired form. The nut waste composite is softer and more flexible as compared to plastic materials yet provided durability and rigidness. During the preparation of the nut waste composite, the nut waste component increases the plasticity of the composite, decreases the viscosity and friction as measured by a reduced amount of torque necessity for compounding, extruding, molding, or thermoforming. This property allows for the preparation of a variety of forms, shapes, and articles in various shapes and sizes.

(g) Extruding, Molding, or Thermoforming the Heated Mixture from Step (f) into a Pot Form The next step in the process, step (g), comprises extruding, molding, or thermoforming the heated mixture from step (f) into a pot form. The pot form from the extruding, molding, or thermoforming process may of various sizes, various shapes, and various depths.

Steps (e) through (g), may be also performed in a continuous manner. Thus, the nut waste component may be contacted with at least one binder; heating the mixture of the nut waste component and at least one binder; extrusion, molding, or thermoforming, and then extrudes, molds, or thermoforms the composite in various shapes such as pellets, granules, and flakes for example.

(h) Cooling the Pot Form to Form the Cured Nut Waste Pot Composite

The final step in the method, step (h), is to allow the form from step (g) to initially cool to about 100° C. to about 130° C. At this temperature range, the malleable pre-composite can be readily formed into various shapes. Some non-limiting examples of suitable forms or shapes are not limited to viscous liquid resins, solid resins, pellets, flakes, disks, wafers, or ribbons. The malleable pre-composite extruded, air injected, compressed, and molded into numerous shapes, or forms. Some non-limiting examples of these shapes and forms may be a pot, a sheet, or a panel. Once these shapes are formed and cooled to room temperature, a durable form in prepared. In some embodiments, the viscous liquid resins, solid resins, pellets, flakes, disks, wafers, or ribbons may be heated again to form a malleable pre-composite and then extruded, molded, compressed, or thermoformed. In this embodiment, these the viscous liquid resins, solid resins, pellets, flakes, disks, wafers, or ribbons can be prepared at a manufacturing facility, transported to a molding facility to form the final formed composites.

(i) Optionally Contacting the Composite with at Least One Fungus, at Least One Bacterium, or a Combination of at Least One Fungus and One Bacterium When the nut waste component is dried or pH adjusted and then dried, the at least one fungus, at least one bacterium, or a combination of at least one fungus and one bacterium will be present in the composite. When the nut waste composite is either sterilized or torrefied or pH adjusted and then sterilized or torrefied, the composite does not contain at least one fungus, at least one bacterium, or a combination of at least one fungus and one bacterium. In this case, the at least one fungus, at least one bacterium, or a combination of at least one fungus and one bacterium may be optionally added. The cured nut waste composite would naturally biodegrade especially in contact with water and is biocompostable. A list of suitable fungi and bacteria are detailed above in Section (I). The at least one fungus, at least one bacterium, or a combination of at least one fungus and one bacterium may be introduced using numerous methods known in the art. Non-limiting methods may be spraying an aqueous solution of at least one fungus, at least one bacterium, or a combination of at least one fungus and one bacterium or painting an aqueous solution of at least one fungus, at least one bacterium, or a combination of at least one fungus and one bacterium onto the composite, or inoculating the composite.

(III) Methods of Using the Nut Waste Composite

The present disclosure also encompasses methods of using the cured nut waste composite. The cured nut waste composite can be casted, blow molded (using air or an inert gas such as extrusion blow molding, injection blow molding, injection stretch blow molding), extrusion molded, injection molded, matrix molded, molded, and thermoformed into various products as plastics. Some non-limiting examples of suitable forms or shapes are not limited to viscous resins, solid resins, pellets, flakes, disks, wafers, ribbons, pots, sheets, and panels.

Some of these forms or shapes of the nut waste composites may be further made malleable using heat and transformed into a variety of end products. Some non-limiting examples of suitable end products produced from the cured nut composite may be carpet underlayment, flooring, insulation, shipping containers for everything from wine, biotechnology, genetic engineering, organ procurement, diagnostic testing to pharmaceutical distribution, modular roofing and landscaping trays currently used in the building and landscape construction industry, biodegradable flower pots, seed pots, lids for cups, as well as many others.

In one embodiment, the end product is a pot. These pots can be used in seed and vegetable propagation industry. These pots can additionally be utilized to propagate plant cuttings, start annual plants, and start perennial plants from either cuttings or seeds. These pots will fit into standard carry trays and pro-totes. In another embodiment, the pot is designed for shipping plants to customers. These pots are configured with a side drain hole for effectively watering the plants to potential customers in any weather condition, and heavy-duty rims for easy stacking. These pots would have increased thickness in the walls as compared to the other pots to provide a durable shipping container. All these pots would be biocompostable and biodegradable.

These pots can be in various shapes (such as a circular shape or a square shape), sizes, and dimensions.

FIG. 1, FIG. 2, FIG. 3, and FIG. 4 shows examples of various pot produced using the nut waste composite.

Figure 5:
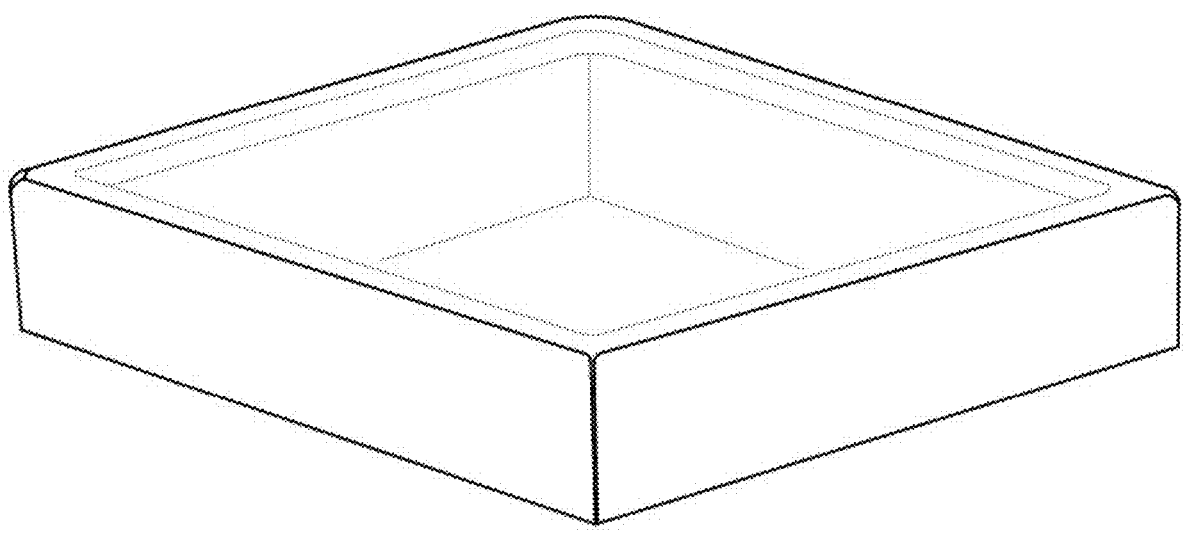
FIG. 5 is a graphical representation of a tray produced from the nut waste composite.
Figure 6:
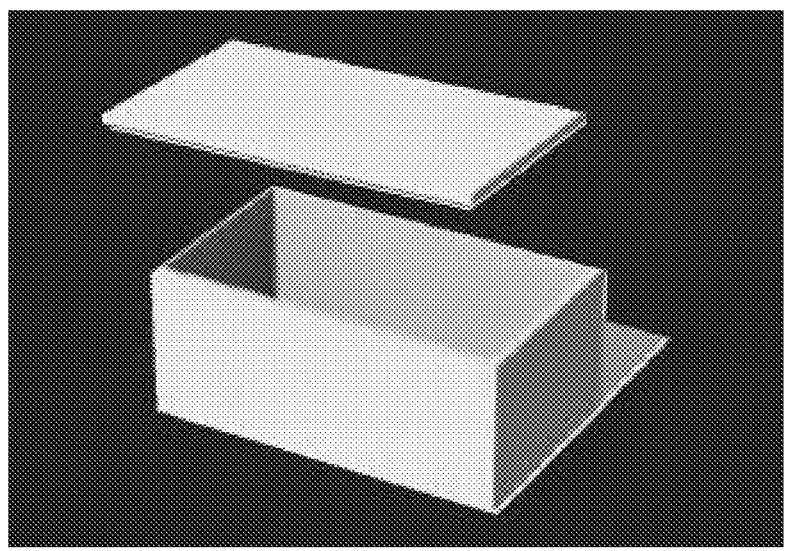
FIG. 6 shows shipping container produced using the nut waste composite.

FIG. 5 shows a tray produced from the nut waste composite. FIG. 6 shows shipping container produced using the nut waste composite.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

The word "about: is intended to mean±5% of the value.

As various changes could be made in the above-described methods without departing from the scope of the invention, it is intended that all matter contained in the above description and in the examples given below, shall be interpreted as illustrative and not in a limiting sense.

EXAMPLES

Example 1

Into a compounder was placed 40 g of nut waste component in various sizes and amounts which were dried. Into the compounder was added the appropriate amount of an equal mixture of polylactic acid and polyhydroxybutyrate. The mixture was stirred mechanically for 30 minutes at room temperature then heated to 165° C.-200° C. for 10 minutes. These mixtures were cast into various disks to evaluate their mechanical properties. These mixtures were compared to a mixture of PLA and PHB (Bioplast 2202) without the nut waste component. Table 1, shown below, shows the results of these tests.

TABLE 1

| Composition | Elastic Modulus (N/mm2) | Max Stress (N/mm2) | Break Stress (N/mm2) | Max Displacement Strain % | Toughness J |
|---|---|---|---|---|---|
| 100% Bioplast 2202 | 2485 | 42.67 | 30.83 | 13.5 | 1.5905 |
| 5 Wt. % <250 um Shell | 2109 | 41.97 | 40.43 | 3.32 | 0.3204 |
| 10 Wt. % <250 um Shell | 2278 | 30.57 | 30.09 | 1.84 | 0.1195 |
| 15 Wt. % <250 um Shell | 2202 | 17.08 | 17.08 | 1.32 | 0.0748 |
| 20 Wt. % <250 um Shell | 2822 | 22.88 | 22.3 | 4.09 | 0.2361 |
| 4.9 Wt. % <500 um & >250 um Shell | 2575 | 42.8 | 40.27 | 6.97 | 0.6958 |
| 9.9 Wt. % <500 um & >250 um Shell | 2696 | 38.3 | 37.88 | 4.32 | 0.4003 |
| 14.3 Wt. % <500 um & >250 um Shell | 2521 | 30.87 | 30.15 | 2.82 | 0.1871 |
| 20 Wt. % <500 um & >250 um Shell | 2562 | 26.46 | 26.46 | 2.12 | 0.1237 |
| 5 Wt. % <250 um Hull | 2565 | 24.99 | 24.96 | 1.61 | 0.0969 |
| 10 Wt. % <250 um Hull | 2021 | 3.44 | 3.29 | 0.27 | 0.0062 |
| 15 Wt. % <250 um Hull | 2016 | 12.08 | 10.44 | 3.06 | 0.093 |
| 20 Wt. % <250 um Hull | 2101 | 7.49 | NA | 6.76 | 0.0948 |

As can be seen in the above Table 1, the nut waste composites exhibit similar elastic modulus as compared to Bioplast 2202, provide similar break stress, and show lower max displacement strain, toughness, and max stress.

Example 2

Into a round bottom flask was placed 40 g of <250 µm dried nut shells. Into the flask was added 40 g of potable water. This mixture was stirred for 10 minutes until a homogeneous mixture was obtained. The mixture was placed in a Carver press at 150° C. and maximum pressure for 15 minutes. Upon exiting the Carver press, a mold was prepared. Weight 39.8 g.

Example 3

Into a round bottom flask was placed 70 g of <250 μm dried almond nut hulls and 30 g of polyhydroxybutyrate. The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a tile shape. The mold was removed from the press and cooled to about 120° C. The tile was cooled to room temperature. The following properties of the tile shaped nut composite was obtained as shown in Table 2:

TABLE 2

| 70/30: Almond Hull/PHB | |
| --- | --- |
| Elastic Modulus (GPa) | 1.02-1.19 |
| Maximum Strain (%) | 1.26-1.38 |
| Break Stress (MPa) | 13.41-15.20 |
| Flexural Strength (MPa) | 13.41-15.20 |
| Toughness (J/m$^3$) | .041-.042 |

Example 4

Into a round bottom flask was 63 g of <250 μm dried almond nut hulls. Into the flask was added 27 g of polyhydroxybutyrate and 10 g of castor oil. The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a pot shape. The mold was removed from the press and cooled to about 120° C. The pot was cooled to room temperature. The Melt Flow Index (g/10 min) found ranging from 0.03-0.961.

Example 5

Into a round bottom flask was 60 g of <250 μm dried almond nut hulls. and 40 g of polyhydroxybutyrate. The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a tile shape. The mold was removed from the press and cooled to about 120° C. The tile was cooled to room temperature. The following properties of the tile shaped nut composite was obtained as shown in Table 3:

TABLE 3

| 60/40: Almond Hull/PHB | |
| --- | --- |
| Elastic Modulus (GPa) | 0.90-1.08 |
| Maximum Strain (%) | 1.20-1.5 |
| Break Stress (MPa) | 12.57-13.56 |
| Flexural Strength (MPa) | 12.57-13.56 |
| Toughness (J/m$^3$) | .044-.058 |

Example 6

Into a round bottom flask was 54 g of <250 μm dried almond nut hulls. Into the flask was placed 36 g of polyhydroxybutyrate and 10 g of castor oil. The components were stirred thoroughly to ensure the components were well distributed. Into a warmed hot molding press maintained at 180° C. to 200° C. was placed the mixture of components. The press was activated placing 10 tons of pressure for a period of 10 minutes molding the components into a pot shape. The mold was removed from the press and cooled to about 120° C. The pot was cooled to room temperature. The Melt Flow Index (g/10 min) found ranging from 1.3 to 4.4.

Example 7: Comparison of Nut Waste Composite Properties with Polypropylene and Polyhydroxybutyrate Table 4, shown below, provides a comparison of properties of the nut waste composite using polyhydroxybutyrate versus polypropylene and polyhydroxybutyrate alone.

TABLE 4

| Property Comparison | | | | |
| --- | --- | --- | --- | --- |
| | 70/30: Hull/PHB | 60/40: Hull/PHB | Polypropylene (from literature) | PHB (from literature) |
| Elastic Modulus (GPa) | 1.02-1.19 | 0.90-1.08 | 0.46-3.20 | 1.14-1.19 |
| Maximum Strain (%) | 1.26-1.38 | 1.20-1.5 | 24-150 | 6-9 |
| Break Stress (MPa) | 13.41-15.20 | 12.57-13.56 | 10-15 | 24-27 |
| Flexural Strength (MPa) | 13.41-15.20 | 12.57-13.56 | 15-21 | 35 |
| Toughness (J/m$^3$) | .041-.042 | .044-.058 | .27-.5 | 0.6 |

What is claimed is:

1. A cured nut waste pot composite prepared by the following method comprising the following steps:
    (a) providing a nut waste component selected from the group consisting of nut shells, nut hulls, and a combination of nut shells and nut hulls;
    (b) drying the nut waste component or adjusting the nut waste component to a pH of 5.0 to 8.0 then drying, sterilizing, or torrefying the nut waste component;
    (c) cooling the dried or pH adjusted then dried, sterilized, or torrefied nut waste component to room temperature;
    (d) grinding the nut waste component to a size less than 250 μm;
    (e) contacting the nut waste component from step (c); one or more binders selected from a group consisting of polyhydroxybutyrate (PHB), polyhydroxyalkanoate (PHA), polyhydroxybutyrate (PHB), polylactic acid (PLA), guayule, natural latex, bentonite, an anionic starch, hyaluronic acid, and any combinations thereof; and an oil producing a mixture;
    (f) heating the mixture to a temperature from about 150° C. to about 320° C. for about 15 minutes;
    (g) extruding, molding, or thermoforming the heated mixture from step (f) into a pot form; and
    (h) cooling the pot form to form the cured nut waste pot composite;
    wherein the mixture in Step (c) consists of 65 to 99.9 wt %; of the nut waste component, 0.1 to 35 wt % of one or more binders, and 0.0 to 20.0 wt % of an oil; and
    wherein the method further comprises step (i) by adding additional at least one fungus, at least one bacterium, or a combination of at least one fungus and at least one bacterium.

2. The cured nut waste pot composite of claim 1, wherein the pH of the nut waste component ranges from about 6.5 to about 7.0.

3. The cured nut waste pot composite of claim 1, wherein the oil comprises castor oil, coconut oil, corn oil, cottonseed oil, palm oil, rapeseed oil, safflower oil, soybean oil, linseed oil, or tung oil.

4. The cured nut waste pot composite of claim 1, wherein the nut waste component comprises mixtures of cellulose, hemicellulose, and lignin.

5. The cured nut waste pot composite of claim 1, wherein the temperature of step (f) ranges from 165° C.-200° C.

6. A cured nut waste pot composite prepared by the following method comprising the following steps:
- (a) providing a nut waste component selected from the group consisting of nut shells, nut hulls, and a combination of nut shells and nut hulls;
- (b) drying the nut waste component or adjusting the nut waste component to a pH of 5.0 to 8.0 then drying, sterilizing, or torrefying the nut waste component;
- (c) cooling the dried or pH adjusted then dried, sterilized, or torrefied nut waste component to room temperature;
- (d) grinding the nut waste component to a size less than 250 μm;
- (e) contacting the nut waste component from step (c); one or more binders selected from a group consisting of polyhydroxybutyrate (PHB), polyhydroxyalkanoate (PHA), polyhydroxybutyrate (PHB), polylactic acid (PLA), guayule, natural latex, bentonite, an anionic starch, hyaluronic acid, and any combinations thereof; and an oil producing a mixture;
- (f) heating the mixture to a temperature from about 150° C. to about 320° C. for about 15 minutes;
- (g) extruding, molding, or thermoforming the heated mixture into a pot form; and
- (h) cooling the pot form to form the cured nut waste pot composite.

7. The cured nut waste pot composite of claim 6, wherein the pH of the nut waste component ranges from about 6.5 to about 7.0;
wherein the mixture in step (c) consists of 15 to 65 wt % of the nut waste component, 15 to 85 wt % of one or more binders, and 0.0 to 20.0 wt % of an oil; and
wherein the method further comprises step (i) by adding additional at least one fungus, at least one bacterium, or a combination of at least one fungus and at least one bacterium.

8. The cured nut waste composite of claim 6, wherein the oil comprises castor oil, coconut oil, corn oil, cottonseed oil, palm oil, rapeseed oil, safflower oil, soybean oil, linseed oil, or tung oil.

9. The cured nut waste pot composite of claim 6, wherein the nut waste component comprises mixtures of cellulose, hemicellulose, and lignin.

10. The cured nut waste pot composite of claim 6, wherein the temperature of step (f) ranges from 165° C.-200° C.

11. A cured nut waste pot composite prepared by the following method comprising the following steps:
- (a) providing a nut waste component selected from the group consisting of nut shells, nut hulls, and a combination of nut shells and nut hulls;
- (b) drying the nut waste component or adjusting the nut waste component to a pH of 5.0 to 8.0 then drying, sterilizing, or torrefying the nut waste component;
- (c) cooling the dried or pH adjusted then dried, sterilized, or torrefied nut waste component to room temperature;
- (d) grinding the nut waste component to a size less than 250 μm;
- (e) contacting the nut waste component from step (c); one or more binders selected from a group consisting of polyhydroxybutyrate (PHB), polyhydroxyalkanoate (PHA), polyhydroxybutyrate (PHB), polylactic acid (PLA), guayule, natural latex, bentonite, an anionic starch, hyaluronic acid, and any combinations thereof; and an oil producing a mixture;
- (f) heating the mixture to a temperature from about 150° C. to about 320° C. for about 15 minutes;
- (g) extruding, molding, or thermoforming the heated mixture into a pot form; and
- (h) cooling the pot form to form the cured nut waste pot composite;
wherein the mixture in step (c) consists of 5 to 15 wt % of the nut waste component, 65 to 95 wt % of one or more binders, and 0.0 to about 20.0 wt % of an oil; and
wherein the method further comprises step (i) by adding additional at least one fungus, at least one bacterium, or a combination of at least one fungus and at least one bacterium.

12. The cured nut waste pot composite of claim 11, wherein the pH of the nut waste component ranges from about 6.5 to about 7.0.

13. The cured nut waste composite of claim 11, wherein the oil comprises castor oil, coconut oil, corn oil, cottonseed oil, palm oil, rapeseed oil, safflower oil, soybean oil, linseed oil, or tung oil.

14. The cured nut waste pot composite of claim 11, wherein the nut waste component comprises mixtures of cellulose, hemicellulose, and lignin.

15. The cured nut waste pot composite of claim 11, wherein the temperature of step (f) ranges from 165° C.-200° C.

16. The cured nut waste pot composite of either claims 1, 6 or 11, wherein the at least one fungus, at least one bacterium, or a combination of at least one fungus and at least one bacterium comprise *Mycorrihizal inoculum, aureofaciens, Deinococcus erythromyxa, Glomus intraradices, Glomus mosseae, Glomus aggregatum, Glomus clarum, Glomus deserticola, Glomus etunicatum, Gigaspora margarita, Rhizopogon villosullus, Rhizopogon luteolus, Rhizopogon amylopogon, Rhizopogon fulvigleba, Pisolithud tinctorius, Laccaria lacata, Laccari bicolor, Suillus granulatus, Suillus puntatapies, Trichoderma harzianum Trichoderma konigii, Bacillus subtillus, Bacillus lichenformis, Bacillus azotoformans, Bacillus megaterium, Bacillus coagulans, Bacillus pumlis, Bacillus thurengiensis, Bacillus stearothermiphilis, Paenibacillus polymyxa, Paenibacillus durum, Paenibacillus florescence, Paenibacillus gordonae, Azotobacter polymyxa, Azotobacter chroococcum, Sacchtomyces cervisiae, Streptomyces griseues, Streptomyces lydicus, Pseudomonas aureofaceans, Deinococcus erythromyxa, Aureofaceans,* and *Deinococcus erythromyxa.*

* * * * *